United States Patent [19]

Junger et al.

[11] 3,720,642
[45] March 13, 1973

[54] USE OF MODIFIED RESINS AS BINDING AGENTS FOR MINERAL SUBSTANCES

[75] Inventors: Hans Junger, Troisdorf; Hans-Joachim Kotzsch, Rheinfelden; Hans-Joachim Vahlensieck, Wehr/Baden; Franz Weissenfels, Siegburg, all of Germany

[73] Assignee: Dynamit Nobel AG, Postfach, Germany

[22] Filed: Oct. 9, 1970

[21] Appl. No.: 90,174

[30] Foreign Application Priority Data

Oct. 2, 1969 Germany................P 19 49 759.7

[52] U.S. Cl...............260/37 R, 260/38, 260/39 R, 260/DIG. 40
[51] Int. Cl...............................................C08k 51/04
[58] Field of Search............260/38, 37 R, 39; 164/43

[56] References Cited

UNITED STATES PATENTS

| | | | |
|---|---|---|---|
| 3,419,517 | 12/1968 | Hedrick et al. | 260/37 N |
| 3,234,159 | 2/1966 | Cooper | 260/38 X |
| 3,297,086 | 1/1967 | Spain | 260/38 X |
| 3,331,885 | 7/1967 | Rider et al. | 260/38 X |
| 3,403,721 | 10/1968 | Robins et al. | 164/43 |
| 3,409,579 | 11/1968 | Robins | 260/30.4 |
| 3,331,885 | 7/1967 | Rider et al. | 260/38 X |
| 3,546,157 | 12/1970 | Mercer | 260/38 |

Primary Examiner—Morris Liebman
Assistant Examiner—S. M. Person
Attorney—Burgess, Dinklage & Sprung

[57] ABSTRACT

Improvements in the strength and other characteristics of sand filled resin, particularly phenolic resin bodies by incorporating epoxy silanes of the formula:

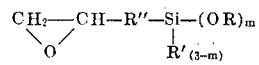

wherein $m$ is 2 or 3,
R and R' are 1 to 4 carbon alkyls, and
R'' is a 1 to 8 carbon alkylene or alkylene ether in with such resin.

3 Claims, No Drawings

USE OF MODIFIED RESINS AS BINDING AGENTS FOR MINERAL SUBSTANCES

This invention relates to resin bonded inorganic filler containing shaped articles. It more particularly refers to such shaped articles having improved strength characteristics.

Formed bodies are known which consist of inorganic fillers, such as expanded shale, expanded clay and granulated glass foam, and foamable phenolic resins as binding agents. The light inorganic substances mentioned can be replaced by other materials, such as sand, and the foamable phenolic resin used as binding agent can be replaced by non-foam synthetic resins, such as those made on a basis of phenols and aldehydes. For example, glass fiber mats or fleeces bonded with solid resins are known, as are formed bodies which contain sand as the mineral filler component and which are used in making casting molds, for example.

Formed bodies of this kind must satisfy varying requirements in regard to their mechanical properties; often very high strengths are required. It is known that the mechanical properties can be improved by using as binding agents resins modified with aminoalkylsilanes. Depending on the type of resin used, a marked improvement of the mechanical characteristics are thus obtained, mainly in the strength characteristics.

It is therefore an important object of this invention to improve the physical properties of inorganic filled, resin bonded shaped articles.

It is another object of this invention to improve the strength characteristics of such articles.

Other and additional objects will become apparent from a consideration of this entire specification including the claims hereof.

In accord with and fulfilling these objects, one aspect of this invention resides in a shaped article comprising a resin binding agent; a mineral substance filler bonded by the resin; and an epoxy silane of the formula:

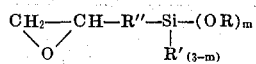

wherein $m$ is 2 or 3, R and R' are the same or different alkyl group of 1 to 4 carbon atoms and R" is an alkylene of 1 to 8 carbon atoms or an alkylene ether of the same number of carbon atoms, modifier for said resin bonding agent.

It has been found that the products of this invention have improved mechanical properties as compared with the properties of similar products with no resin modifier as well as compared with the properties of similar products with an aminosilane resin modifier.

The epoxy silane of this invention is required to have the epoxide or oxirane group in the terminal position.

Examples of such compounds are 3,4-epoxybutyl-trimethoxysilane, 5,6-epoxyhexylmethyldiethoxysilane, etc.

The following are examples of compounds in which the radical R" contains oxygen bridges: 3-glycidyloxy-propylmethyl dimethoxysilane and diethoxysilane, 3-glycidyloxypropyl trimethoxysilane and triethoxysilane, 3-(B-glycidyloxethoxy)-propyltriethoxysilane, 3-glycidyl-oxypropyldimethyloxyethylsilane etc.

These epoxy silane compounds are prepared in a known manner by combining hydrogentrialkoxysilanes or hydrogen alkyldialkoxysilanes, in the presence of a platinum catalyst, with correspondingly unsaturated compounds of an olefinic character according to the reaction:

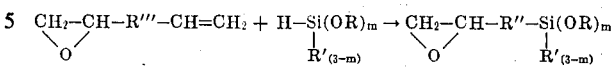

In this formula, R, R; and R" represent the groups named above, and R''' represents an alkylene radical whose carbon chain has 2 carbon atoms fewer than the above-mentioned radical R".

Mineral substances which are bonded with the resins to make the formed bodies according to this invention are those inorganic materials which contain oxydic surfaces containing hydroxyl groups, such as for example $SiO_2$ in its various manifestations, silicate materials, quartz sand, glass in all its manufactured forms, e.g., fibers, mats, fabrics, laminates, and foamed glass in granular or spheroidal form. Minerals containing aluminum and titanium oxide can also be used.

The formed bodies are made by first conventionally preparing the bonding resin, adding the silane, preferably in bulk, to this resin either during or after the preparation of the latter, and then mixing the thus modified resin with the mineral substance filler that has previously been charged into the mixer. The shaped articles are then formed in a conventional manner. The amount of silane modifier mixed into the resin is between 0.01 and 2.0 percent, and preferably between 0.1 and 0.8 percent, of the weight of the resin.

The formed bodies made according to the invention have strength characteristics which are 100 to 600 percent higher than those made with an unmodified resin, depending on what kind of resin is used. The improvement of the strength of formed bodies made according to the invention over those made with a resin modified with γ-aminopropyltrimethoxysilane amounts to between about 20 and 200 percent, depending on the resin involved.

One particular advantage of the resins modified according to the invention and of the formed bodies made therefrom lies in the fact that embrittlement of the resin by overhardening is prevented or reduced. When unmodified resins, or resins which are made with the prior-art modifying agents, are used as binding agents for formed bodies made of mineral substances, this embrittlement takes the form of a reduction in strength characteristics over the course of a relatively long period, such as 24 hours. This is not the case with the formed bodies manufactured according to this invention.

The resins used as bonding agents for the mineral substances can be cold-setting or heat-setting resins produced by the condensation or polycondensation of aldehydes with phenols and/or furfuryl alcohol and/or urea. Condensation products that form in the pH range above 7 as well as those that form in the pH range below 7 can be used.

Examples of such cold-setting resins are the condensation products that are obtained, for example, by the condensation of 1 mole of a phenol with 1 to 3 moles of an aldehyde in a preferably aqueous, alkaline medium, followed by distillation of the water in a vacuo down to a solid resin content of 60 to 80 percent, and adjustment of the pH to values greater than 4, if desired.

Phenol and its monocyclic homologs, such as the cresols and resorcinol, xylenols, or mixtures of these compounds, can be used as phenols. The aldehydes reacting with the phenols include, among others, formaldehyde, compounds which decompose to formaldehyde such as paraformaldehyde, trioxane or hexamethylenetetramine, adetaldehyde and furfurol, and mixtures of these compounds.

Furthermore, co-condensation products of furfuryl alcohol, urea, phenol in some cases, and formaldehyde, can be used as cold-setting resins. The individual components are present in the condensation in the following molar ratios:

| Phenols | 0.1 to 1.0 |
|---|---|
| Urea | 0.3 to 1.0 |
| Furfuryl alcohol | 0.1 to 1.0 |
| Formaldehyde | 2.0 to 4.0 |

The co-polycondensation of these compounds can be performed in an alkaline medium analogously to the condensation of the above-named phenol formaldehyde resins. In the condensation of these compounds it has been found to be especially desirable to perform the condensation step-wise, total or partial quantities of the starting components being used in the individual steps.

As a starting component, the urea can be wholly or partially replaced by urea derivatives which are capable of reacting with aldehydes. Examples of such compounds are: thiourea, methyl and methylol urea, melamine, ammeline or benzoguanamine, and mixtures of these compounds.

Furfuryl alcohol can be replaced wholly or partially by furfurol and formaldehyde can be replaced wholly or partially by other aldehydes already mentioned above.

Heat-setting resins which are used as binding agents for the mineral substances are mainly the resins known as novolaks. These are to be understood to be chiefly those resins which are obtained by acid and/or alkaline condensation of aldehydes with phenols, in a ratio of phenols to aldehydes of less than 1 : 1.

The condensation is generally performed by heating the phenol with the aldehyde in, for example, an acid medium, to temperatures between 60° and 100°C and performing the condensation at this temperature for a period between 1 and 4 hours. Then the water is distilled off by vacuum distillation until the desired solid resin content is reached. The resin obtained in this manner can, after cooling and crushing be mixed with a hardener (preferably hexamethylenetetramine) and the silane, and then it can be mixed into the mineral substance, or it is added without silane to the mineral substances to whose surface the silane has been applied, or a solution of this resin preferably in alcohol, is prepared and the silane can be added to it, and then it is mixed together with the hardener into the mineral substance.

After the mixing of the resin with the mineral substance with the addition of the silanes used according to the invention, the mixture is made into formed bodies at elevated temperature in a known manner.

This invention will be illustrated by the following examples which are not limiting hereon.

EXAMPLE 1

A resin was prepared from a mixture of 9 kg of phenol (90% solution) and 12.7 kg of formaldehyde (30 percent solution) by heating this mixture to 100°C, then adding 120 g NaOH and keeping the temperature of this mixture at 100°C, for 25 to 30 minutes. Then the water was distilled off in vacuo until a viscosity of about 1500 cP was reached. Then phenol (90 percent solution) was added to this liquid phenolic resol resin in a quantity amounting to 5.5 percent of the weight of the resin.

a. To prepare formed body specimens, 2.4 g of this resin was mixed with 100 g of H 32 Haltern sand and 0.4 g of an aqueous 60 percent solution of p-toluenesulfonic acid and shaped in a +GF+ test specimen mold into +GF+ bending test sticks. After the sticks were shaped (172 × 28.5 × 22.5 mm) they were let stand at room temperature. Then the bending strength was measured over a period of several hours after forming.

b. In like manner, test sticks were prepared with the addition of 0.2 percent based upon the weight of the resin of γ-aminopropyltrimethoxysilane which was mixed into the sand together with the previously prepared resin and the hardener, and they were tested.

c. In the same manner as described under (b), test sticks were prepared with the addition, according to the invention, of 0.2 wt. % of 3-glycidyloxypropyltrimethoxysilane instead of γ-aminopropyltrimethoxysilane, and were tested.

The following Table 1 gives the strength characteristics over the testing period of time and strength improvement achieved expressed as a percentage:

TABLE 1

| Formed bodies with addition of— | Bending strength in kp./cm.$^2$ after— | | | | | Strength improvement in percent after— | | | | |
|---|---|---|---|---|---|---|---|---|---|---|
| | 1 hr. | 3 hr. | 5 hr. | 8 hr. | 24 hr. | 1 hr. | 3 hr. | 5 hr. | 8 hr. | 24 hr. |
| γ-aminopropyl trimethoxysilane | 2.0 | 22.0 | 24.0 | 22.0 | 20.5 | | | | | |
| | 5.0 | 24.0 | 28.5 | 31.0 | 25.0 | 150 | 22.7 | 18.8 | 42.4 | 22.0 |
| 3-glycidyloxypropyltrimethoxysilane | 9.0 | 34.5 | 53.5 | 59.5 | 61.0 | 150 | 56.8 | 123 | 170 | 195 |

The measurement of bending strength was performed in an ordinary +GF+ strength testing apparatus.

EXAMPLE 2

A cold-setting resin was prepared by first heating 164.5 g of phenol (100 percent), 1200 g of formaldehyde (37 percent solution) and 420 g of urea for 15 minutes at 100°C. Then 844 g of formaldehyde (37 percent solution), 500 g of furfuryl alcohol and 4 g of sodium carbonate were added and condensed for another 75 minutes at 100°C. Then the water was distilled in vacuo until the viscosity was brought to about 1500 cP. The solid resin content then amounted to about 60 percent.

2.0 g of this resin was mixed as in Example 1 with 100 g of H 32 Haltern sand and 0.33 g of a 70 percent aqueous solution of $H_3PO_4$ as hardener, first without the addition of an adhesivizing agent, and formed into test sticks.

Test sticks containing adhesivizing agents were made by adding the adhesivizer ($\gamma$-aminopropyltrimethoxysilane in one case and 3-glycidyloxypropyltrimethoxysilane in the other) to the resin after the distillation, in quantities amounting to 0.2 percent of the weight of the resin. The rest of the procedure and testing was performed as in Example 1.

The bending strength values of these test sticks and the improvement of the strength values over a period of several hours are set forth in Table 2 below:

TABLE 2

| Test specimen with addition of— | Bending strength in kp./cm.² after— | | | | | Strength improvement in percent after— | | | | |
|---|---|---|---|---|---|---|---|---|---|---|
| | 1 hr. | 3 hr. | 5 hr. | 8 hr. | 24 hr. | 1 hr. | 3 hr. | 5 hr. | 8 hr. | 24 hr. |
| — | 0.0 | 14.0 | 21.5 | 25.0 | 22.5 | | | | | |
| $\gamma$-Aminopropyltrimethoxysilane | 0.0 | 34.0 | 57.0 | 70.0 | 70.0 | 100 | 143 | 174 | 180 | 211 |
| 3-glycidyloxypropyltrimethoxysilane | 6.0 | 35.5 | 57.0 | 58.0 | 61.0 | 600 | 154 | 165 | 132 | 170 |

EXAMPLE 3

A heat-setting novolak to serve as bonding agent was prepared by mixing 1.8 kg of phenol (100 percent) with 1.17 kg of formaldehyde (37 percent solution) and heating to 100°C. Then 0.012 kg of hydrochloric acid (30 percent solution) was added and the mixture was heated for 200 to 220 minutes at the boiling temperature. Then the mixture was subjected to a vacuum distillation until no more water distilled out. After cooling the novolak was crushed and ground to the desired fineness.

89 weight parts of the ground novolak were mixed with 11 weight parts of hexamethylenetetramine; then 0.2 wt. % of $\gamma$-glycidyloxypropyltrimethoxysilane was added to the mixture in the mixing machine. 2 to 6 percent of a paraffin oil, for example, can be added to this mixture to prevent dust from flying from the resin-sand mixture that is to be prepared. The silane can also be added together with the paraffin oil.

The novolak-hexamethylenetetramine mixture (5 g) was mixed with 12 B Duing sand (100 g).

The mixture prepared from the sand and the novolak-hexamethylenetetramine mixture was made into test sticks at 250°C. The sticks were tested by heating them for 60 seconds at 250°C, and then measuring the bending strength either immediately (a) or after cooling (b). As in Examples 1 and 2, three sticks were prepared for comparative testing, either without modifying agent or with a known aminosilane or with the silane that is used according to the invention. The results are listed in Table 3.

TABLE 3

| Test specimen made with the addition of: | Bending strength (in kp/cm²) | | Improvement of bending strength in % | |
|---|---|---|---|---|
| | a) hot | b) cold | a) hot | b) cold |
| — | 22.0 | 43.5 | — | — |
| $\gamma$-aminopropyl- | | | | |
| trimethoxysilane | 23.0 | 48.0 | 4.6 | 10.3 |
| 3-glycidyloxypropyl- trimethoxysilane | 24.5 | 49.0 | 11.4 | 12.6 |

EXAMPLE 4

A novolak was prepared as in Example 3, but instead of mixing it with hexamethylenetetramine, 65 g of the crushed novolak was dissolved in 35 g of methanol (the methanol can be wholly or partially replaced with ethanol). In one case 130 mg of a prior-art silane ($\gamma$-aminopropyltrimethoxysilane) and in the other 130 mg of a silane according to the invention ( 3-glycidyloxypropyltrimethoxysilane) was mixed into this solution. 192 g of this novolak solution was mixed with a mixture of 6000 g of 12 B Duing sand, 120 g $Fe_2O_3$ and 19.2 of hexamethylenetetramine; after the mixture is dried, 6.3 g of calcium stearate is also mixed in. The testing of the test sticks and the measurement of the bending strength were performed as in Example 3. Also, the bending strength was measured on test sticks which, after the 20 seconds of hardening in the core box, were heat treated for an additional 10 and 20 minutes at 200°C. The results of the test are listed in Table 4.

TABLE 4

| Test stick with the addition of— | Bending strength in kp./cm.² | | | | | |
|---|---|---|---|---|---|---|
| | Without heat treatment | | After heat treatment for— | | | |
| | | | 10 min. | | 20 min. | |
| | Hot | Cold | Hot | Cold | Hot | Cold |
| — | 11.0 | 1.5 | 16.0 | 27.0 | 19.0 | 27.0 |
| $\gamma$-Aminopropyltrimethoxysilane | 16.2 | 22.5 | 17.5 | 34.0 | 20.0 | 34.5 |
| Strength improvement, percent | 47.7 | 66.7 | 9.4 | 25.9 | 5.3 | 27.8 |
| 3-glycidyloxypropyltrimethoxysilane | 18.5 | 22.0 | 20.0 | 35.0 | 21.5 | 38.0 |
| Srength improvement, percent | 68.2 | 63.0 | 25.0 | 29.6 | 13.2 | 40.7 |

What is claimed is:

1. A shaped article of sand, the bonding agent for said sand being selected from the group consisting of phenol-aldehyde, furfurol-aldehyde and urea-aldehyde and including an epoxy silane modifying agent of the formula:

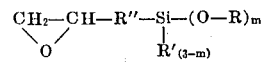

wherein m is 2 or 3
R and R' are each alkyl of 1 to 4 carbon atoms and
R'' is alkylene or alkylene ether of 1 to 8 atoms of carbon.

2. A shaped article as claimed in claim 1 wherein said modifying agent is present in a proportion of about 0.01 to 20 weight percent.

3. A shaped article as claimed in claim 1 wherein said modifying agent is present in a proportion of about 0.1 to 0.8 weight percent.

* * * * *